United States Patent [19]

Most et al.

[11] 4,441,922

[45] Apr. 10, 1984

[54] TREATMENT METHOD FOR METAL BEARING OILY WASTE

[75] Inventors: Ivan G. Most, Cape Elizabeth; William S. Hubble, Bridgton, both of Me.

[73] Assignee: Kramer Industries, Inc., Greenfield, Mass.

[21] Appl. No.: 370,397

[22] Filed: Apr. 21, 1982

[51] Int. Cl.³ .............................................. C22B 1/00
[52] U.S. Cl. ...................................... 75/25; 75/44 S; 75/28; 110/216; 110/236; 134/2; 134/19
[58] Field of Search ................. 75/44 S, 44 R, 43, 25, 75/26, 28; 134/2, 19; 110/216, 236

[56] References Cited

U.S. PATENT DOCUMENTS 3,564,699  2/1971  Moore ................................. 75/44 S
3,627,288  12/1971  MacDonald ........................ 75/44 S

FOREIGN PATENT DOCUMENTS 57-89443  6/1982  Japan .................................. 75/44 S Primary Examiner—M. J. Andrews
Attorney, Agent, or Firm—Wolf, Greenfield & Sacks

[57] ABSTRACT

A continuous process and system for treatment of oily waste products and heavy sludge resulting from the washing of scrap metal fragments bathed in oil. The sludge and oily waste both include a mixture of water, ferrous containing particulates and a hydrocarbon liquid. The process of this invention includes feeding the heavy sludge and oily waste into an incinerator, incinerating the hydrocarbon liquid contained therein at conditions such that the metal contained therein is recovered as particulate ash, and venting the resulting combustion gases to the atmosphere. The system of this invention includes an incinerator, an auger for transporting heavy sludge from the scrap washer to the incinerator, a pump and storage tank for feeding oily waste from the scrap wash water to the incinerator, and a baghouse for filtering the combustion gases and exhausting them to the atmosphere. A second auger may be provided for transporting sludge from a sludge storage tank, and a water heater may be provided for passing the combustion gases in heat exchange relationship with wash water. The incinerator utilizes a starved air principle and includes a primary chamber and a secondary chamber where temperatures and oxygen levels are carefully controlled. The ferromagnetic ash from the incinerator and the particulates recovered in the baghouse can be sold for scrap.

16 Claims, 5 Drawing Figures

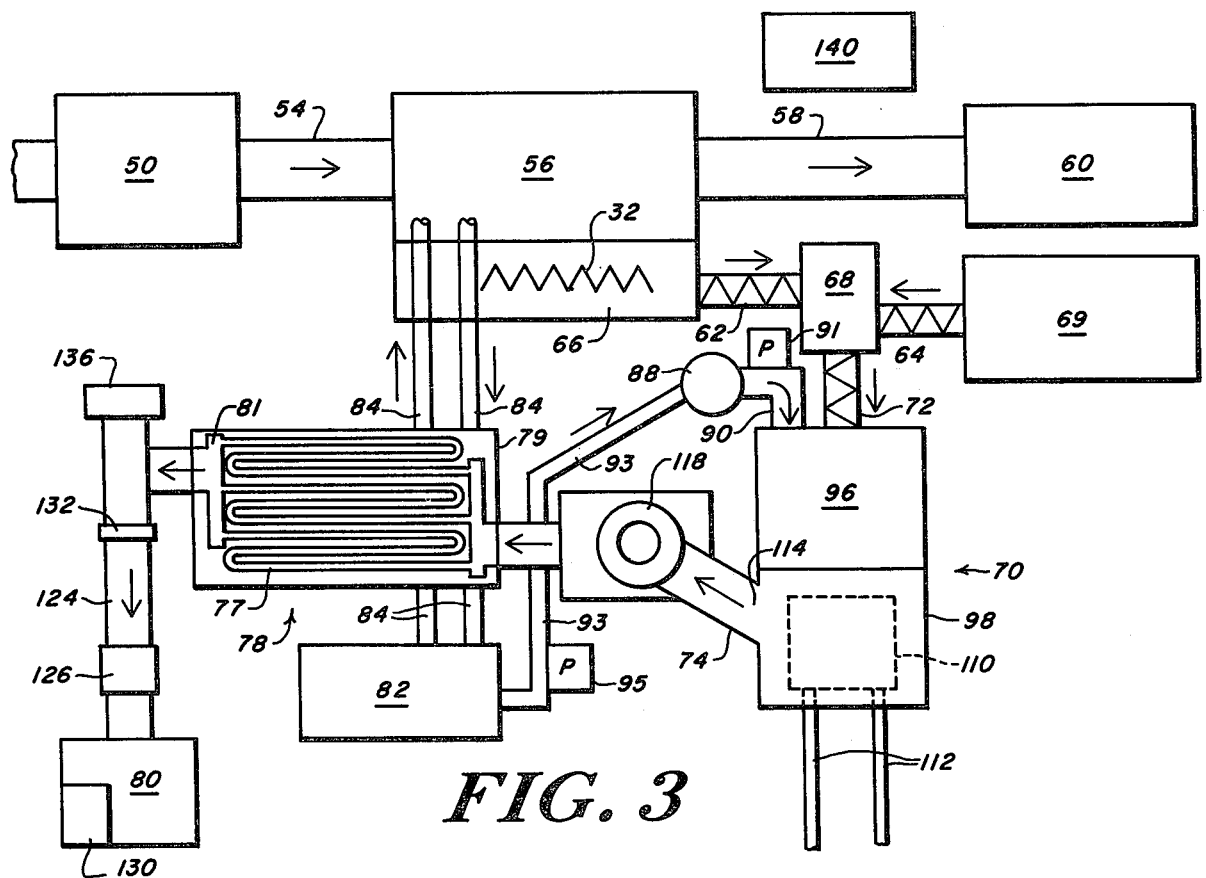
FIG. 3
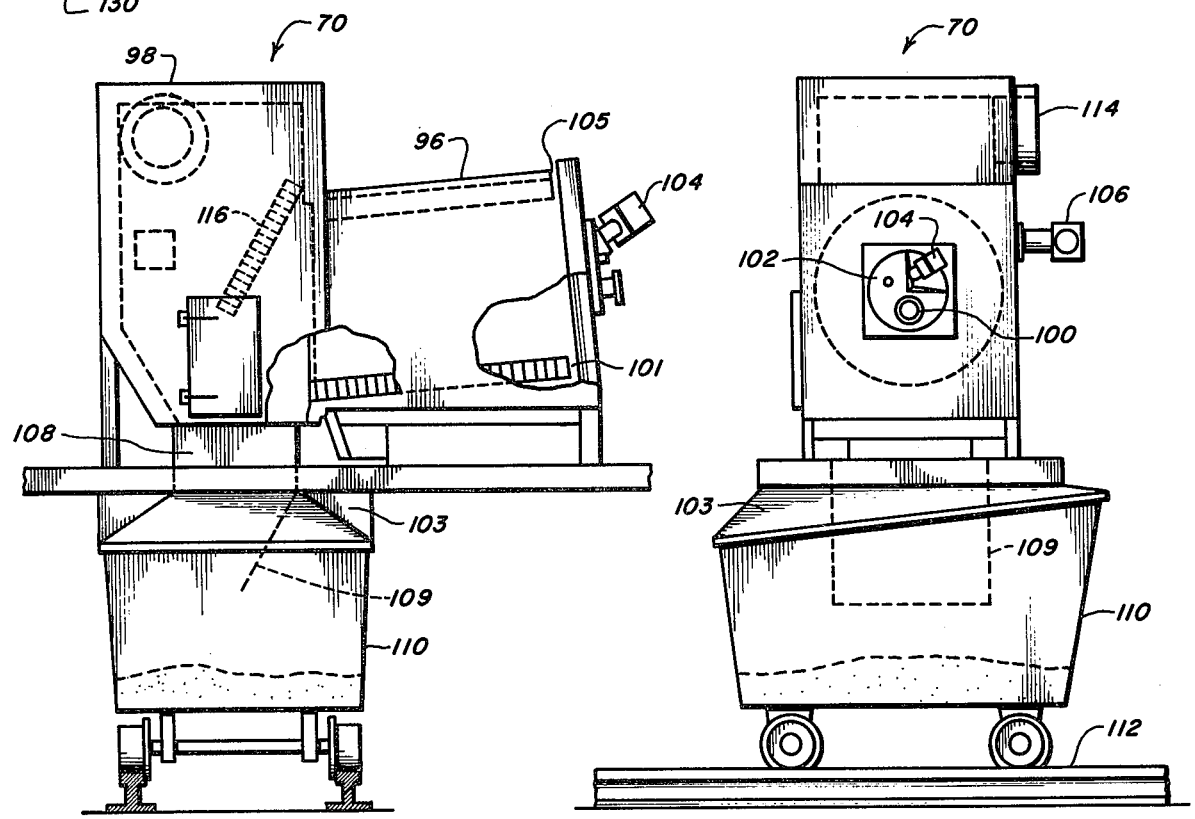
FIG. 4
FIG. 5

TREATMENT METHOD FOR METAL BEARING OILY WASTE

FIELD OF THE INVENTION

This invention relates generally to treatment of waste products and more particularly to disposal of metal bearing oily wastes and recovery of the metallic components therefrom.

BACKGROUND OF THE INVENTION

It is common to recover for reuse or recycling scrap iron or steel from discarded products, such as automobiles or the like. One particular type of recycling which presents special waste disposal problems is the recovery of scrap iron or steel from automotive engines and transmissions which are bathed in oil. The clean, sorted cast iron produced in such a recovery process is typically sold as scrap iron feed for subsequent industrial and foundry use.

In a typical recovery process, automotive scrap engines and transmissions are dropped into a large hopper in which a hydraulic ram breaker machine crushes them into fragments having widths of approximately 2 to 6 inches. This crushed, fragmented material is then passed onto a conveyer belt in which the nonmetallic components, such as wire, hoses and the like are removed from the metal scrap stream. These crushed fragments are then passed into a rotary drum washer in which the fragments are tumbled and washed by a heated detergent and water solution. The water typically is heated for the washing cycle by a separately powered water heater which circulates heated water to the washer in a continuous cycle. The resulting clean cast iron is then discharged from the washer to another conveyer belt which conveys the fragments to a sorting building. In the sorting building, the crushed material is separated into cast iron and steel. The material is then transported out of the sorting building into exterior storage piles, after whch it is shipped by rail or truck to foundry customers.

During washing of the fragments in the washer, heavy sludge containing small cast iron grit settles out of the continuous flow of hot detergent water and into the bottom of the tank. The waste water also contains oily wastes which are permitted to settle out. Both this oily waste and the washer sludge in most typical prior art systems are removed and hauled away to a local landfill dump for disposal.

This disposal of the heavy sludge and oily wastes resulting from this recovery process has presented certain health problems because of the toxic nature of the waste product, which often includes lead and many ferrous compounds. These materials tend to leach into the soil and often reach the water supply system near the landfill disposal site. As a result, landfill disposal of such sludge and oily waste is no longer permitted in many areas, thus presenting a problem for operators of such scrap recovery systems and substantially increasing the cost thereof. Prior to this invention, no fully acceptable commercially used alternative existed for the disposal of this heavy sludge. In addition, no fully acceptable commercially used system was available for recovery of the waste products contained in this heavy sludge or oily waste.

SUMMARY OF THE INVENTION

The present invention provides a continuous system and method for safe, non hazardous disposal of the heavy sludge and oily waste generated by a scrap iron recovery system, such as that described above for an automobile engine scrap processor. In addition, the system and method of this invention permit recovery for reuse of certain noncombustible materials contained in the heavy sludge and oily waste. In the method of this invention, oily wastes and heavy sludge are treated by mechanically feeding them into an incinerator which operates on a starved air principal and incinerating the hydrocarbon liquid contained in the waste and sludge. Preferably the flow of combustion air into the incinerator is controlled to maintain oxygen levels in the incinerator exhaust at between 4% and 6% by volume and to maintain combustion temperatures in the incinerator at between 1600° F. and 2350° F. Maintaining the combustion temperatures and exhaust oxygen levels within these ranges allows the metallic components to form a particulate ash and not a slag mass. The resulting heavy metallic ash is recovered from the base of the secondary chamber of the incinerator. Resulting combustion gases are then vented through a pipe and then through a heat exchanger typically heating the wash water for washing of the scrap. The combustion gases are then exhausted to the atmosphere, preferably through a particle separator, such as a cyclone separator and/or a baghouse to recover any particulate matter therein.

The apparatus which implements the process of this invention includes an inclined auger for transporting the heavy sludge from the washer upwardly, an incinerator into which the heavy sludge is fed for combustion, a chute for recovering metallic ash produced in the incinerator, a conduit for venting the exhaust gases from the incinerator to a heat exchanger for recovering the exhaust gas heat and a baghouse for removal and recovery of exhaust particulate. The incinerator includes a primary chamber in which a starved air principal is preferably utilized for combustion and a secondary chamber in which the combustible materials are further burned at higher temperatures to accomplish complete combustion of the waste material. A cooling port may be provided adjacent the baghouse for control of the temperatures of the entering combustion gases. A storage tank and pump may also be provided for feeding oily waste to the incinerator for combustion along with the sludge. The oily waste is allowed to settle out of the wash water in a settling basin and a pump feeds the oily waste to the storage tank. A hopper may be provided intermediate the washer and incinerator for the delivery of sludge to the incinerator and a second auger may be included for feeding sludge from a second storage tank to the hopper.

The metallic ash and the exhaust particulate can be sold as scrap along with the crushed iron and steel recovered in the sorting building. The method and apparatus of this invention also allow recovery of the heat produced during the combustion step for heating of the wash water, thereby obviating a burner or other heat generating means for the water heater. As a result, the only waste products resulting from the process which require disposal are non-toxic gases which are vented to the atmosphere. This invention thus overcomes the problems inherent in prior art scrap iron recovery systems and can provide a more economical, energy efficient and safer system by obviating the dumping of toxic waste, providing more complete recovery of the scrap material to provide additional income, and reducing the energy input for heating of the wash water by recycling heat produced.

BRIEF DESCRIPTION OF THE DRAWING

The objects, advantages and features of this invention will be more clearly appreciated from the following detailed description taken in conjunction with the accompanying drawing in which:

FIG. 3 is a top view of the apparatus of FIG. 2; and

FIG. 4 is a side view of the furnace of this invention; and

FIG. 5 is an end view of the furnace of FIG. 5.

DETAILED DESCRIPTION OF THE PREFERRED EMBODIMENT

Figure 1:
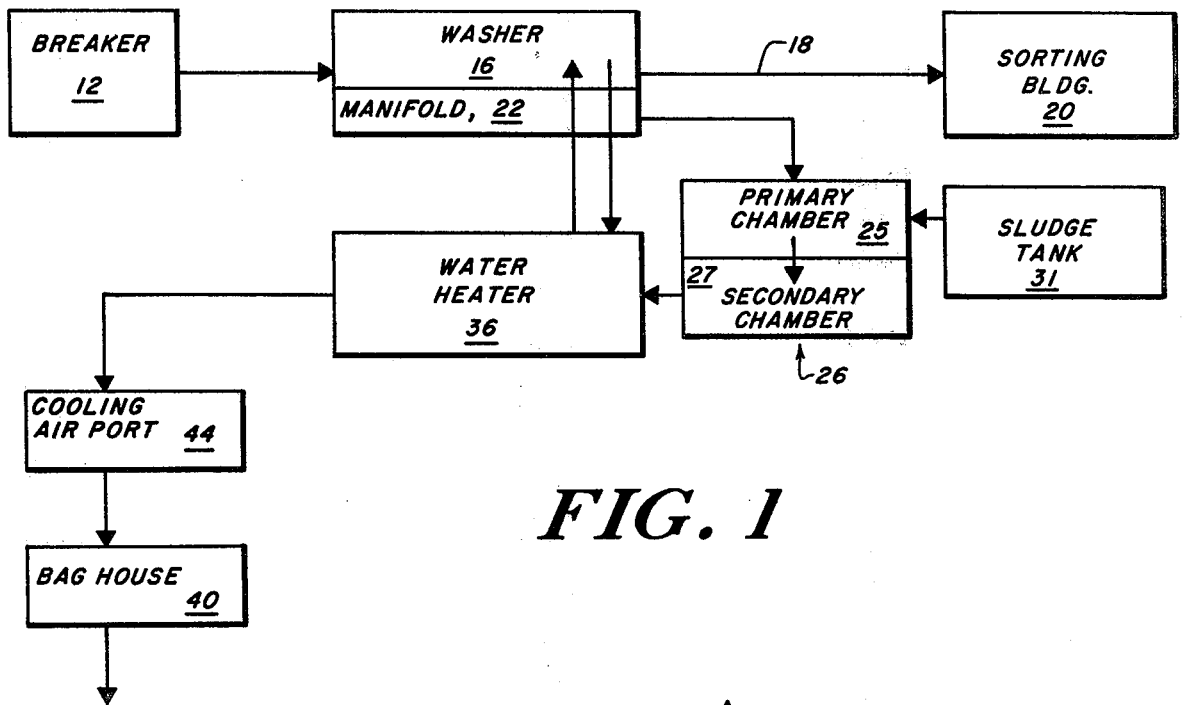
FIG. 1 is flow diagram of the method of this invention.
Figure 2:
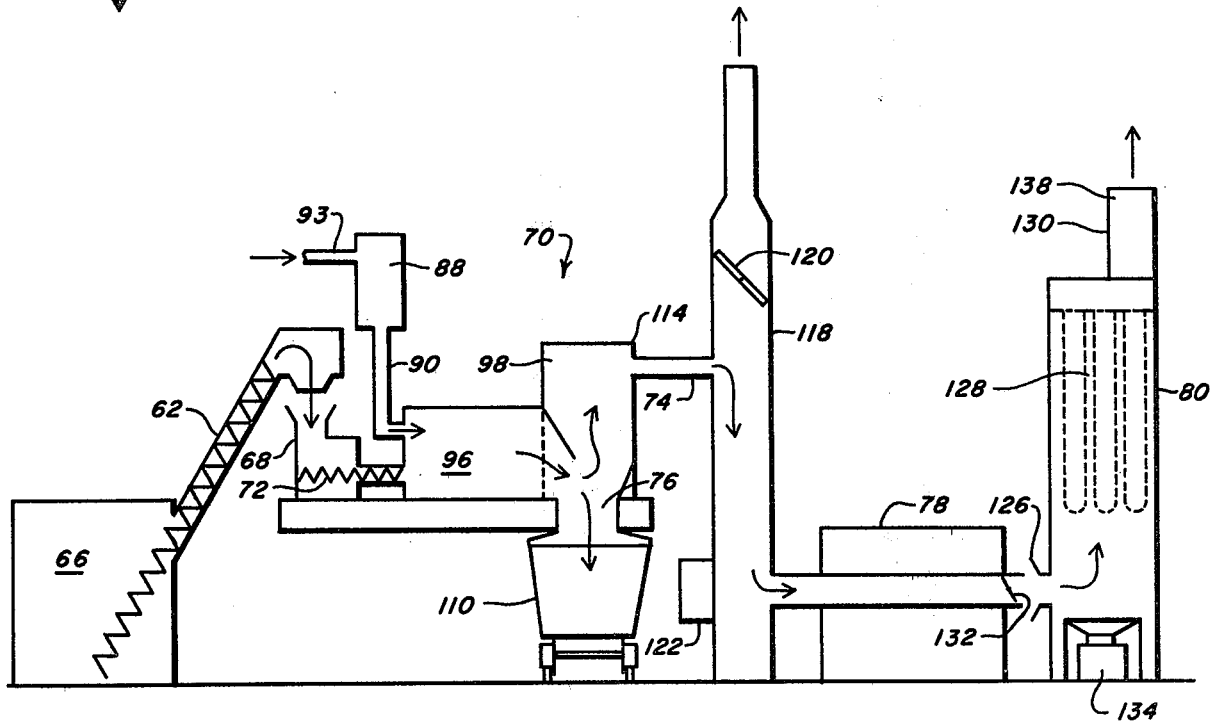
FIG. 2 is a side view of a schematic of the apparatus of this inventions.

With reference now to the drawing, and more particularly to FIG. 1 thereof, a continuous process of this invention will be described for treating sludge resulting from the cleaning of scrap iron and steel. One application of this process is in conjunction with a process for cleaning scrap iron and steel from crushed automobile engines and transmissions. This sludge is defined generally as the waste by product of a scrap working process regardless of the discharge point and comprises a mixture of water, ferrous containing particulates and hydrocarbon liquids. There are two individual sludge strains which result from this process, one is heavy sludge and the other is waste oil. The heavy sludge usually comprises oil, water, cast iron grit and dirt and has the consistency of oatmeal. Heavy sludge settles out of the continous flow of wash water and into the bottom of the washer. It contains about 30% by weight of water, 50% to 60% by weight of ferrous particulate, particularly iron, and 10% to 20% by weight of hydrocarbon liquids. The waste oil comprises water, oil, dirt and cast iron grit having a particle size similar to that of sand. The waste oil contains up to 60% by weight of water, about 25% by weight of ferrous products and at least 15% by weight of hydrocarbon liquids and is a result of prolonged settling of water used for washing the scrap.

As previously indicated, in existing scrap breaker lines, automotive scrap engines, transmissions and the like are dropped into a large hopper or a hydraulic ram breaker machine 12 which crushes them into fragments having a width of approximately 2 inches to 6 inches. A conveyer belt 14 carries these crushed fragments toward a rotary drum washer 16. Prior to entry into the washer, non metallic components such as wire, hoses and so forth are removed. The crushed metal is passed into washer 16 in which it is tumbled and washed by a heated detergent and water solution. The detergent water is heated on a continuous basis by water heater 36. The clean cast iron is then discharged from the washer to another conveyer belt 18 which conveys it into a building 20 where the cast iron and material is sorted and recovered into separate piles after which it is transported to foundry customers.

One of the by products of the washing process is the heavy sludge described hereinabove which settles out of the continious flow of hot detergent water and into the bottom of washer 16 as the water passes over the dirty crushed iron therein. In the process of this invention, this heavy sludge is transported from a washer manifold 22 into the primary chamber 25 of incinerator 26 for burning. Heavy sludge stored in sludge tank 31 may also be fed to primary chamber 25. When the water from the washer is allowed to sit, the other sludge strain, oily wastes, settles out, and these oily wastes are pumped to primary chamber 25 for incineration with the heavy sludge. The hydrocarbon components of the heavy sludge from washer 16 and tank 31 and of the waste oil are incinerated within primary chamber 25 at temperatures ranging from 1600° F. to 2100° F. in a starved air environment with exhaust oxygen levels of the combustion gases being maintained in the range of 4%° to 6%° by volume by the control of flow of combustion air into the incinerator. These hydrocarbon components fuel the incineration process, but a burner may be provided for temperature maintenance. These materials are then passed continously during combustion to a secondary chamber 27 in which combustion continues at higher temperatures in the range of 2000° F. to 2350° F. The maintenance of these temperature and oxygen conditions permits the formation of a particulate metallic ash from the metallic constituents of the oily waste and heavy sludge and prevents the formation of a slag mass. The solid particulate ash is deposited from secondary chamber 27 of incinerator 26 for recovery. Resulting combustion gases are vented from secondary chamber 27 to water heater 36 where they are passed in heat exchange relationship with wash water which is subsequently provided to washer 16. Gases entering water heater 36 generally have a temperature of 2500° F. while gases exiting water heater 36 generally have a temperature of 500° F.

The exhaust gases are exited from water heater 36 and are passed through a particulate recovery system 40, typically a baghouse, after which they are vented to the atmosphere. The exhaust gases are cooled to a temperature of around 400 degrees prior to their entry into system 40 by a cooling air port 44. Particulate matter within the exhaust gases is collected by recovery system 40 and may be sold as scrap.

In another aspect of the process of this invention, a simplified method is provided for raising particularly oily heavy sludge from sludge tank 31 upwardly to primary chamber 25. A screw auger typically must raise the sludge within tank 31 upwardly, approximately at a 45 degree angle. If the sludge present in tank 31 is particularly oily and has a high BTU content the auger becomes lubricated and this sludge tends to slide back down the auger. This results in an uncontrolled feed of sludge which is highly undesirable, because of the requirement for a continuous flow and for the maintenance of desired oxygen and temperature levels within the incinerator. Presently existing solutions to the problem of augering a slippery mass upwardly include the addition of sawdust to such a mass. However, this solution requires the addition of an additional constituent to the process which is not a result of the process and which must be purchased and imported from an outside source and which has a high BTU content. In this invention, this problem may be overcome by the addition of the product ash recovered from secondary chamber 27 after incineration of the sludge. If a certain quantity of this ash is added to the sludge within tank 31, it has been found that the lubricating effect of the oil is overcome, and the sludge is provided with a more solid consistency which can be raised by the auger, because the ash is very porous and adsorbs the oil. Typically, the ash and sludge are mixed in approximately equal proportions by volume. The use of the ash in this manner has certain benefits, since the ash itself is a low BTU material and does not affect the combustion process, and since the need for another filler which has a higher BTU rating and which must be purchased is eliminated.

With reference now to FIGS. 2-6, the apparatus for implementing the above process will be described. One application of this apparatus is the treatment of sludge produced by a standard scrap breaker line which includes a hydraulic ram breaker machine 50 for breaking the scrap into fragments, a conveyor belt 54 for transporting the scrap fragments from machine 50 to a rotary washer 56 for washing of the scrap fragments and a conveyor belt 58 for transporting the washed scrap fragments from washer 56 to a sorting building 60 for sorting of the scrap fragments into steel and iron. Washer 56 is a standard rotary or centrifugal washer used in such processes.

The apparatus of this invention includes an incinerator for combustion of hydrocarbon liquids contained in the sludge and oily waste, a feed auger 62 for feeding sludge to incinerator 70, a settling basin 82 for permitting waste oil to settle out of the scrap wash water, waste oil reservoir 88 for storing waste oil and feeding it to the incinerator, ash collection chute 76 for recovering metallic ash from the incinerator, water heater 78 for heating wash water and a baghouse 80 for exhausting and filtering the combustion gases.

A screw auger 32 transports the heavy sludge deposited in washer manifold 66 during the washing process horizontally along washer manifold 66 to an end adjacent screw auger 62. Auger 32 also squeezes some of the water from the heavy sludge. Screw auger 62, which is positioned at about a 60° angle, raises the heavy sludge in a controlled and metered manner from washer manifold 66 upwardly to hopper 68. A sludge tank 69 also may be provided if desired for storing heavy sludge produced by the breaker line when incinerator 70 is inoperative, for miscellaneous yard sludge, sludge from conveyer belt 54 and any residue of sludge recovered from settling basin 82 or manifold 66. If sludge tank 69 is provided, so is screw auger 64 which intermittently feeds heavy sludge from tank 69 upwardly at about a 45° angle to hopper 68 as is necessary to dispose of any sludge within tank 69 and as such sludge can be accomodated by hopper 68. Auger 72 serves to meter all this heavy sludge from hopper 68 in a generally horizontal direction into the incinerator 70. Auger 72 controls the feed of heavy sludge to incinerator 70 to provide continuous feed and to provide the desired rate of combustion.

At the end of an operating day, or at the end of an operation, the wash water used in washer 56 is conducted to settling basin 82 through pipes 84 to allow waste oil therein to settle out. This resulting oily waste is conducted by pump 95 through lines 93 from the settling basin 82 to storage tank 88. The waste oil in tank 88 is pumped directly into the incinerator by pump 91 and lines 90 during operation of the system. Pump 91 typically is a variable speed controlled pump so that the feed of waste oil into the incinerator is carefully monitored to provide a continous feed and to provide the desired rate of combustion.

Incinerator 70 will now be described with reference to FIGS. 4 and 5. Incinerator 70 includes a primary chamber 96 and a secondary chamber 98 and operates on a starved air principal. Incinerator 70 provides a large interior surface area spread for burning and combustion of the waste products, and it is capable of burning both the liquid oily waste and the more solid heavy sludge. Incinerator 70 provides a continuous flow of the oily waste and sludge therethrough as it is being combusted so that no buildup occurs within the incinerator and so that the ash which is formed is a solid particulate and not a slag mass. The prevention of the formation of the slag mass is also controlled by proper temperature and oxygen maintenance, as described. The continuous flow is enhanced by the provision of a slight tilt to primary chamber 96 downwardly towards secondary chamber 98 thus encouraging the burning materials to move continously through primary chamber 96 and into secondary chamber 98. This tilt of primary chamber 96 is typically less than 10° from the horizontal.

Primary chamber 96 is a rotary drum while secondary chamber 98 is stationary, and both are typically refractory lined. The heavy sludge and waste oil are initially fed into primary chamber 96 through ports 100 and 102 respectively where the hydrocarbon liquids contained therein are first combusted. Primary chamber 96 and its refractory lining is initially heated by a front wall burner 104 to the desired temperature, and burner 104 maintains the temperature of primary chamber 96 at between 1600° F. and 2100° F. Once the required incineration temperatures are reached, the combustion process sustains itself and burner 104 is turned off. Burner 104 typically has a capacity of about 1,500,000 BTU's per hour, but usually is operated at about 600,000 BTU's per hour. A secondary burner 106 is provided for maintenance of the proper temperature levels in secondary chamber 98 which are typically between 2000° F. and 2350° F. Secondary burner 106 has a capcity of 3,000,000 BTU's per hour but typically is operated at 600,000 BTU's, and it too is shut off once the desired temperatures are reached. Burners 104 and 106 feed air into incinerator 70 only while they are ignited.

The oxygen level within primary chamber 96 and secondary chamber 98 is controlled to produce oxygen levels within the combustion gases exhausted from secondary chamber 98 within a range of 4% to 6% by volume. These oxygen levels are maintained by controlling the flow of combustion air into the incinerator through adjustable ports 101 and 105 in primary chamber 96 and this flow of combustion air is controlled by adjusting the size of ports 101 and 105 and by adjusting the speed of exhaust fan 130. By maintenance of the temperature and exhaust oxygen levels within the indicated ranges the metallic ash produced from the metallic components of the heavy sludge and oily waste in the incinerator is in the form of solid granular particles and not a unitary slag mass. Once combustion has been completed, the metallic ash is deposited from secondary chamber 98 through chute 76 and into cart 110 disposed therebelow. Cart 110 is maintained in sealing relation with chute 76 and with secondary chamber 98 by seal 103 so that no air is allowed to enter to interfere with the temperature maintenance therein and with the gas flow therethrough. Once cart 110 has been filled, it may be removed along rails 112 and a new cart may be put in place. During this period of transition, chute 76 is sealed by door 109 so that the combustion can continue uninterrupted. A baffle 116 is provided within secondary chamber 98 at the point where the burning materials exit primary chamber 96 and enter secondary chamber 98. Baffle 116 deflects the flow of gases in the burning materials downwardly around its lower edge to increase the flow path of the burning materials through secondary chamber 98 and to increase their residence time therein to promote complete burning thereof. In addition, the circular path provided to the burning materials generates centrifugal forces which induces heavy particulate ashes to settle out of the gas flow and fall into cart 110. Baffle 116 also promotes turbulence within the gas flow which enhances the mixing of the combustible materials and air. Additionally, baffle 116 serves as a radiation shield which protects primary chamber 96 from the higher temperature present in secondary chamber 98 and radiates heat back into the secondary chamber.

Resulting combustion gases are exhausted from secondary chamber 98 through outlet 114 and into exhaust lines 74 which feed into stack 118. Stack 118 conducts the gases to water heater 78 and includes a bypass valve 120 which is kept in a normally closed position. Should problems develop in waterheater 78, such as overheating of the water or the pipes, or should the baghouse become clogged, the gases may be diverted through valve 120 and to the atmostphere. Exhaust lines 74 and stack 118 normally include refractory lined connecting pipes capable of withstanding temperatures of 2500 degrees or greater, which is the general temperature of the gas as it exits the incinerator. An auxiliary burner 122 may be provided at the base of stack 118 to permit additional heating of the gases in stack 118 for heating of the water within water heater 78, should the gas temperature drop below the desired level or should combustion not be occuring within incinerator 70.

Water heater 78 typically includes a plurality of pipes through which combustion gases are passed in heat exchange relationship with the wash water. In a preferred embodiment, waterheater 78 includes twelve six inch diameter metal tubes 77 welded into a rectangular tank 79 for holding the wash water. The tubes 77 terminate in boxed headers 81 at each level. The tubes are arranged in 3 sets of 4 parallel tubes and the combustion gases pass in one direction through each set of four tubes. Thus, the gases are provided with 3 passes through tank 79. The use of the three path heat exchanger increases the surface area over which the heat exchange process occurs and provides a maximum temperature drop in the tubes. In addition, the large number of tubes results in only a minimal pressure drop through the heat exchanger. The tubes are straight and the boxed headers at each end can be removed, so that the interior of the tubes can be easily cleaned by running a brush therethrough. The presence of the water within tank 79 prevents tubes 77 from being destroyed by the excessively high gas temperatures which are typically about 2500° F. upon entering water heater 78 and about 550 degrees F. upon exiting thereof. Water heater 78 recovers heat energy from the combustion gases thus obviating a fired oil burner which is typically used to heat the wash water for the washer in existing scrap breaker lines. Pipes 84 circulate the wash water on a continuous basis between washer 56 and water heater 78 to maintain the wash water at the desired temperature which is typically 100°–140° F.

Pipes 124 conduct the gases from water heater 78 into the baghouse 80. Disposed in pipe 124 adjacent baghouse 80 is a cooling air port 126 which allows the entrainment of cooler ambient air into the combustion gas flow for cooling thereof. An air control damper 132 may be provided within pipe 124 upstream of port 126 to control the flow of combustion gases into baghouse 80. In this manner, the mixture of ambient air and combustion gases can be monitored to provide gases entering the baghouse with the required inlet temperatures of 400 degrees F. or less. Inlet temperatures greater than 400° F. could cause damage to baghouse 80. Baghouse 80 may be any commercially available baghouse known to those skilled in the art and includes a plurality of filters 128 for trapping fine particulate matter carried by the gas flow. Filters 128 are typically cloth, and the particulate matter is deposited on the outer surface thereof. Filters 128 are cleaned in a known manner by utilizing a reverse pulse air system which causes the particulate matter trapped thereby to fall into cannister 134 for recovery thereof. Other known particulate removal systems, such as a cyclone separator, may be used in place of baghouse 80 and port 126.

Disposed on top of baghouse 80 is a fan 130 which drives the entire exhaust system and draws gases from outlet 114, through stack 118 and water heater 78 into baghouse 80 and out through stack 138 where the remaining gases are vented to the atmosphere. Air flow into the incinerator 70 is controlled primarily by ports 101 and 105 and fan 130. An auxiliary fan 136 may be provided in parallel with the baghouse and is used only when fan 130 is not operative. In this event, damper 132 is closed, and combustion gases are diverted from baghouse 80 and are vented through fan 136.

The system of this invention may also be provided with a plurality of sensors which detect abnormal operations and trigger an alarm. In the event of an alarm, combustion gases are diverted up stack 118 by the opening of valve 120, and the feed of sludge from hopper 68 is automatically terminated. Any of the following conditions may activate the alarm: loss of electrical power; temperatures in the baghouse inlet which exceed the permitted temperature; loss of fan 130; a water level which falls below a required amount in water heater 78; loss of rotation of primary chamber 96; and temperatures in either the secondary or primary chamber of the incinerator which exceed a desired level. The temperatures and other general conditions of the system are monitored regularly and controlled at control panel 140 which includes temperature limiters and temperature controllers and rate of feed controllers, for both the feed of sludge from hopper 68 and the feed of waste oil from tank 88 into incinerator 70. These instruments are those commonly used in the art for such processing.

Operation of the system of FIGS. 2–6 will now be described. Engines and transmissions are crushed in breaker 50 and transferred by belt 54 to rotary washer 56 in which they are washed in a detergent solution commonly known in the art. Water containing detergent and other solvents, is circulated between water heater 78 and washer 50 by pipes 84. Sludge which is deposited in the washer during the washing process is augered into washer manifold 66, while after use the wash water is pumped into settling basin 82 where an oily waste settles out. The remaining wash water is reused in later operations. Sludge in washer manifold 66 is transported to hopper 68 by means of auger 62, while sludge residing in sludge tank 69 is fed to hopper 68 by means of auger 64. The oily waste in the settling basin is pumped to tank 88 by means of pipes 93, after which it is fed in a controlled manner by pump 91 into primary chamber 96 via port 102. Sludge is metered from hopper 68 into primary chamber 96 via port 100 by means of horizontal auger 72. Oil and sludge in a typical operation is fed to primary chamber 96 at a rate of about 600 pounds per hour with an energy content of about 5000 BTU's per pound.

Primary burner 104 is fired to preheat the primary and secondary chambers and their refractory linings to temperatures in the range of 1600° F. to 2100° F., and air is fed to the incinerator at about 66 pounds per minute through ports 101 and 105. Heavy sludge is metered into primary chamber 96 by auger 72 and waste oil sludge is metered into primary chamber 96 by pump 91. Once in the primary chamber 96, the hydrocarbon liquid components of the sludge and waste oil ignite and fuel the combustion process. These products are passed continuously through primary chamber 96 and into secondary chamber 98 where they are fully combusted and in which temperatures are maintained between 2000° F. and 2350° F. by burner 106. Oxygen levels in the exhaust stream of combustion gases are maintained at between 4% to 6% by volume by ports 101 and 105 and fan 130. The metallic components of the sludge and waste oil form a particulate or granular ash which is diverted into cart 110. Fan 130 draws the combustion gases out of secondary chamber 98 through outlet 114, and into exhaust lines 74, down stack 118 and into tubes 77 within waterheater 78. In waterheater 78 the exhaust gases heat the wash water, and drop in temperature from around 2500° F. to about 550° F. Gases then exit the water heater through pipes 124 and are cooled by cooling air port 126 to a temperature of around 400° F. The combustion gases are passed into baghouse 80 where remaining particulate matter is removed by filters 128, and the gases are exhausted through stack 138. Filters 128 may be cleaned in a known manner by reverse pulses of air, and the particulate matter therefrom falls into cannister 134 for removal. An incinerator having a primary chamber with 171 cubic feet of capacity and a secondary chamber having 113.1 cubic feet of capacity and having an airflow of 5311 ACFM is capable of consuming about three million BTU's per hour of scrap waste having 5000 BTU's per pound of which 75% is non combustable. Retention time in the secondary chamber is about 1.3 seconds.

As described, the method and system of this invention provide for the continuous disposal of toxic waste resulting from cleaning and recovery of scrap metal products, such as automobile transmissions and engines. All materials which can be reused, such as ferrous and non ferrous metals are recovered and sold, while non recoverable materials such as the oil are burned. The only wastes which result are non-toxic gases which are released to the atmosphere. The excess heat of the system is used to heat the water used during the washing process, and therefore is also recovered. Heating costs are thereby greatly reduced, and the cost and dangers of disposal of the toxic waste are eliminated.

Modifications and improvements will occur within the scope of this invention, and the above description is intended as exemplary only. The scope of this invention is defined by the following claims and their equivalents.

What is claimed is:

1. A method for treating sludge comprising a mixture of water, ferrous containing particulate, and hydrocarbon liquids, said sludge resulting from the washing in a heated detergent-and-water solution of crushed metal bathed in oil, said ferrous containing particulate comprising about 10-60% by weight of said sludge, said method comprising the steps of:

mechanically feeding the sludge into an incinerator in a controlled manner;

incinerating the hydrocarbon liquids in starved air conditions such that metallic components of the sludge are removed as a dry metallic particulate, the temperature of incineration being within the range of 1600° F. to 2350° F., and the oxygen levels of the incinerator exhaust being within the range of 4% to 6% by volume, thereby permitting the metallic particulate to be produced as a non-unitary mass; and extracting the metallic particulate from the incinerator exhaust.

2. A method for treating sludge as recited in claim 1 further comprising the step of passing hot combustion gases resulting from said incinerating step to a heat exchanger for recovery of heat therefrom.

3. A method for treating sludge as recited in claim 1 further comprising the step of exhausting hot combustion gases resulting from said incineration step through a baghouse for removal and recovery of particulate matter therein.

4. A method for treating sludge as recited in claim 2 further comprising the steps of:

conducting the combustion gases through a baghouse for removal and recovery of particulate matter in the gases after the combustion gases have been cooled in said passing step; and venting the combustion gases to the atmosphere thereafter.

5. A method for treating sludge as recited in claim 1 wherein said incinerating step comprises the steps of:

burning the hydrocarbon liquid of the sludge in a primary chamber of an incinerator at temperatures ranging between 1600° F. and 2100° F.;

continuously moving the sludge through the primary chamber and into a secondary chamber; and completing the burning of the hydrocarbon liquid of the sludge in the secondary chamber at temperatures ranging between 2000° F. to 2350° F.

6. A method for treating sludge as recited in claim 1 further comprising the steps of:

passing hot combustion gases resulting from said incinerating step to a heat exchanger;

conducting said hot combustion gases in heat exchange relationship with wash water to heat the wash water to a temperature in the range of 100° F. to 140° F.; and returning the heated wash water to a washer for removal of ferrous containing particulate and hydrocarbon liquids from crushed metal scrap.

7. A method for treating sludge as recited in claim 4 further comprising the step of entraining ambient air into the flow of combustion gases from the heat exchanger to the baghouse to cool the combustion gases to a temperature no greater than 400° F.

8. A method for treating sludge as recited in claim 1 wherein said mechanically feeding step comprises the steps of:

raising upwardly a heavy sludge containing about 30% by weight of water, 50% to 60% by weight of ferrous particulate and 10% to 20% by weight of hydrocarbon liquid to a hopper; and augering in a generally horizontal direction the heavy sludge from the hopper to the incinerator at a predetermined rate.

9. A method for treating sludge as recited in claim 8 wherein said upwardly raising step comprises the steps of:

augering to the hopper heavy sludge deposited in a manifold of a washer used to wash ferrous particulate and hydrocarbon liquids from crushed scrap metal; and augering to the hopper heavy sludge from a sludge storage tank which is independent of the washer manifold.

10. A method for treating sludge as recited in claim 9 wherein said step of augering heavy sludge from a sludge storage tank comprises the step of first mixing metallic particulate recovered from the incinerator after said incinerating step with heavy sludge in the sludge tank.

11. A method for treating sludge as recited in claim 1 or 8 wherein said mechanically feeding step further comprises the step of pumping from a settling tank to the incinerator in a controlled manner waste oil comprising up to 60% by weight of water and at least 25% by weight of ferrous particulate and 15% by weight hydrocarbon liquid.

12. In a method of disposing of waste materials resulting from large metallic parts being broken into fragments, the waste materials forming a mixture comprising metal grit, water and hydrocarbon liquid, an improvement comprising the steps of:

passing the mixture to an incineration area with reduced oxygen content;

incinerating the mixture utilizing as a fuel for incineration the hydrocarbon liquid contained in the mixture; and forming a particulate bearing exhaust gas and a solid metallic particulate.

13. A method as recited in claim 12 further comprising the step of treating the exhaust gas to remove particulate material therefrom and to utilize the heat energy thereof.

14. A method for treating heavy sludge comprising a mixture of about 30% by weight of water, about 50% to 60% by weight of ferrous particulate, and about 10% to 20% by weight of hydrocarbon liquid, said method comprising the steps of:

mixing with the heavy sludge a dry metallic particulate previously produced by the incineration of the heavy sludge, the metallic particulate and heavy slude being mixed in about equal proportions by volume;

augering the mixture of heavy sludge and metallic particulate to an incinerator;

incinerating the hydrocarbon liquid in the heavy sludge in starved air conditions and at temperatures within the range of 1600° F. to 2350° F. to permit the formation of the metallic particulate from the ferrous particulate; and recovering the metallic particulate from the incinerator.

15. A method for treating sludge comprising a mixture of water, ferrous containing particulate, and hydrocarbon liquids, the ferrous containing particulate comprising about 10% to 60% by weight of the sludge, said method comprising the steps of:

augering to a hopper heavy sludge from a manifold of a washer used to wash ferrous particulate and hydrocarbon liquids from crushed scrap metal, said heavy sludge containing about 30% by weight of water, about 50% to 60% by weight of ferrous particulate, and about 10% to 20% by weight of hydrocarbon liquid;

mixing with the heavy sludge in the sludge tank a dry metallic particulate previously produced by the incineration of the heavy sludge, the sludge tank being independent of the washer manifold;

augering to the hopper from the sludge storage tank the mixture of heavy sludge and metallic particulate;

augering the heavy sludge from the hopper to an incinerator at a predetermined rate and in a generally horizontal direction; and incinerating the hydrocarbon liquid in starved air conditions such that metallic components of the sludge are removed as a metallic particulate, the temperature of incineration being within the range of 1600° F. to 2350° F., and the oxygen levels of the incinerator exhaust being within the range of 4% to 6% by volume, thereby permitting the metallic particulate to be produced as a non-unitary mass.

16. A method for treating crushed scrap metal bathed in oil, comprising the steps of:

washing the crushed scrap metal in a heated detergent and water solution;

discharging the cleaned scrap metal for recovery thereof;

recovering from the detergent and water solution a sludge comprising a mixture of water, ferrous containing particulate, and hydrocarbon liquids, the ferrous containing particulate comprising about 10% to 60% of the sludge;

mechanically feeding the sludge into an incinerator in a controlled manner;

incinerating the hydrocarbon liquids in starved air conditions such that metallic components of the sludge are removed as a metallic particulate, the temperature of incineration being within the range of 1600° F. to 2350° F., and the oxygen levels of the incinerator exhaust being within the range of 4% to 6% by volume, thereby permitting the particulate to be produced as a non-unitary mass; and extracting the metallic particulate from the incinerator exhaust.

* * * * *